Feb. 11, 1930.  S. A. STAEGE  1,746,618
REGULATOR SYSTEM
Filed May 19, 1928
Fig. 1.
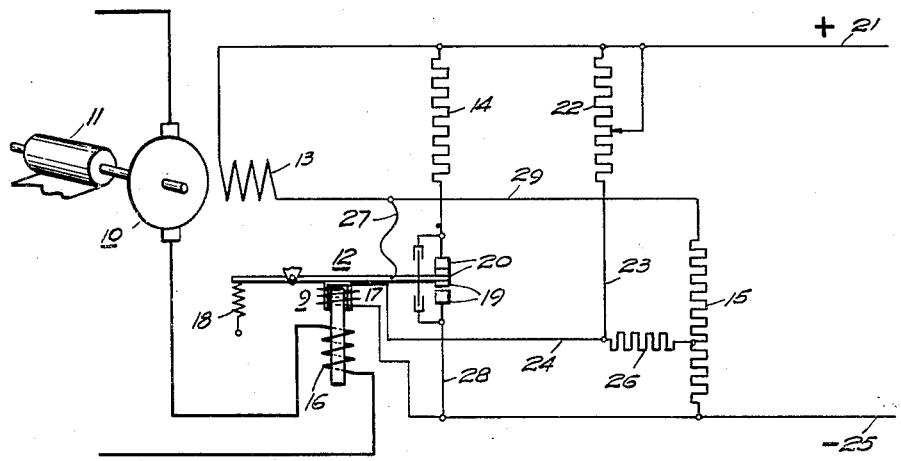
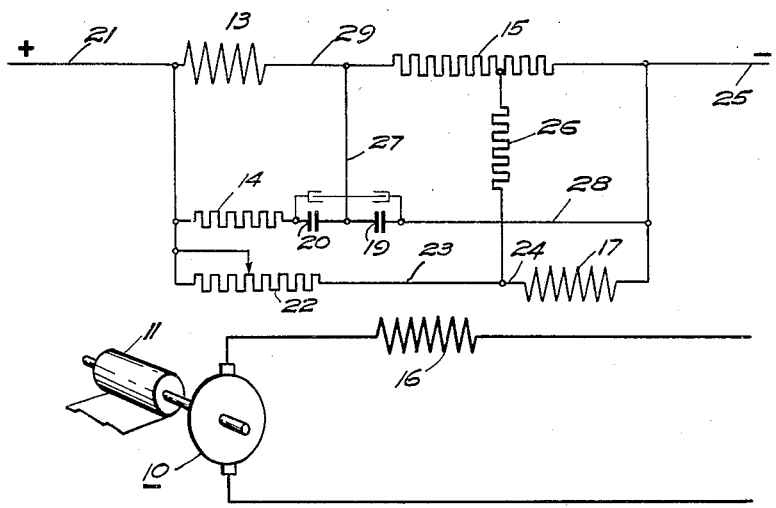
Fig. 2.
INVENTOR
Stephen A. Staege.
BY
ATTORNEY Patented Feb. 11, 1930

1,746,618

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed May 19, 1928. Serial No. 279,122.

My invention relates generally to the control of electric motors and particularly to regulating the torque in variable-speed motors.

In reeling devices, it is desirable to allow the material to be reeled to travel at a substantially constant lineal speed throughout a reeling operation, and, further, to ensure that the pull exerted on the material by the reeling mechanism shall be maintained at a constant value during the operation. As the diameter of the roll of material increases, the speed of rotation in a prime mover must be reduced, in order to maintain the peripheral speed of the reel at a constant value. The moment exerted by the reeled material upon the prime mover increases as the surface moves away from the center of the reel, and the torque of the prime mover must, therefore, be increased to maintain a constant pull on the material to be reeled.

The object of my invention, generally stated, is to provide means for automatically varying the torque exerted by an electric motor as its speed decreases.

A further object of my invention is to provide a regulator system for reeling devices, wherein the pull exerted upon the reeled material will be maintained at a constant value, irrespective of the speed of the prime mover.

A more specific object of my invention is to provide a regulator for an electric motor, wherein the armature current may be held constant while the speed of the motor is varied by a field adjustment.

Other objects of my invention will become apparent to those skilled in the art when the following description is considered in conjunction with the accompanying drawings, in which;

Figure 1 is a diagrammatic view of a regulating system for a motor connected in accordance with my invention, and;

Fig. 2 is a straight-line schematic diagram of the circuits shown in Fig. 1.

In practicing my invention, a motor 10 is disposed to operate a reeling mechanism 11, and a regulator 12 is provided to so govern the torque of the motor 10 as to maintain a desired tension on the material fed to the reel, irrespective of the diameter of the roll. In varying the torque of the motor 10, the regulator 12 operates alternately to connect the resistor 14 in parallel-circuit relation with the shunt field winding 13, through the contact members 20, as shown in Fig. 1, or, when the regulator 12 has moved to its lowermost position, to short-circuit the resistor 15 from the shunt field circuit and disconnect the resistor 14, thereby increasing the voltage across the field winding 13 and reducing the torque of the motor 10.

The regulator 12 is provided with a contact-carrying armature that is biased to one circuit-closing position by a spring 18 and actuated to a second circuit-closing position by two operating coils 16 and 17, which are disposed to attract each other when they are sufficiently energized to overcome force exerted upon the regulator 12 by the spring 18, and actuate the armature into its lowermost position. The regulator 12 may be similar to that disclosed and claimed in a copending application of Walter Schaelchlin, Serial No. 221,422, filed September 23, 1927, and assigned to the Westinghouse Electric and Manufacturing Company.

The operating coil 16 of the regulator 12 is connected in series with the armature of the motor 10, so that it is energized by the current which traverses the armature of the motor 10. The operating coil 17 of the regulator 12 is mounted on the regulator armature and is movable relative to the operating coil 16. The two operating coils 16 and 17 are disposed to attract each other, and when the sum of the current traversing them exceeds a predetermined value, to exert a force which exceeds the force exerted by the spring 18, thus actuating the regulator 12 to its lowermost position, closing the contact members 19 and interrupting the circuit between the contact members 20.

The operating coil 17 of the regulator 12 is energized by a circuit which extends from the positively energized conductor 21, through a variable resistor 22, conductor 23, conductor 24 and the coil 17, to the negatively energized conductor 25. A resistor 26 and the lower portion of the resistor 15 are connected in parallel-circuit relation to the coil 17, and thus the energization of the coil 17 is proportional to the voltage drop across the resistor 26 and the lower portion of the resistor 15. The voltage drop across the resistor 15 is inversely proportional to the voltage across the field winding 13, so that variations in the current which traverses the operating coil 17 increase and decrease oppositely with respect to variations in the voltage across the field winding 13, and the ratio of this current and voltage may be varied by adjustment of the variable resistor 22, or by changing the values of resistor 26 and 15. The connection through the resistor 26 is provided to vary the voltage drop across the operating coil 17 upon the closing of either pair of contact members 19 and 20 in a direction to aid in separating the contact members, so that an anti-hunting action will be introduced in the operation of the regulator 12.

Let is be assumed that the motor 10 is operating with a certain value of armature current to reel material on the reel 11. As the number of layers of the reeled material on the reel 11 increases, the diameter of the reel increases, so that, in order to maintain the previous lineal speed of the reeling material, the speed of the motor 10 must be decreased and, at the same time, the value of the current supplied to the armature of the motor 10 must be maintained substantially constant, so that an increased pull is not exerted upon the reeling material.

As the diameter of the reel 11 increases, an increased moment is exerted on the reeling material by the motor 10, and a corresponding increase in armature current occurs, and, when this increase is of sufficient magnitude to cause the operating coils 16 and 17 to attract each other, actuating the regulator 12 to close the contact members 19, a circuit is established from the field winding 13, through conductor 27, the armature of the regulator 12, contact members 19, and by conductor 28, to the negatively energized conductor 25. Upon the completion of this circuit, the resistor 15 is short-circuited, allowing the current traversing the field winding 13 to be increased, thereby increasing the counter electromotive force generated in the armature of the motor 10 and causing a corresponding reduction in the armature current which traverses the operating coil 16 of the regulator 12. When the regulator 12 moved to its lower position, short-circuiting the resistor 15, the current traversing the resistor 15 was reduced and the voltage drop across the lowermost section of the resistor 15 correspondingly reduced, so that the energization of the operating coil 17 is proportionately reduced. Since the energization of both operating coils 16 and 17 is considerably reduced upon the actuation of the regulator 12, to close its contact members 19, the attractive forces exerted by the coils 16 and 17 are insufficient to retain the armature of the regulator 12 in its lower position, and the spring 18 operates to actuate the armature into its upper position, thereby closing the contact members 20.

When the armature of the regulator 12 is in its upper position, closing the contact members 20, the resistor 14 is connected in parallel-circuit relation to the field winding 13 through a circuit which extends from the positively energized supply conductor 21 through the resistor 14, the contact members 20 of the regulator 12, the armature of the regulator 12, and, by conductor 27, to conductor 29, which is connected to the shunt field winding 13.

The resistor 15 is connected in series with the field winding 13 and is short-circuited when the regulator 12 is actuated to its lower position, so that, when the regulator 12 is in its lower position, the voltage across the field winding 13 is a maximum, while, when the regulator 12 is in its upper position, the field winding 13 is paralleled by the resistor 14, and the two connected in series-circuit relation with the resistor 15, so that the voltage across the field winding is, in this case, at its minimum. During the time required for the regulator 12 to move from its upper to its lower position, or vice versa, the field circuit is limited only by the resistor 15 so that the medium voltage will be impressed on the field windings 13 in this case.

The sensitivity of the operating coils 16 and 17 of the regulator 12 is such that actuation of the relay will take place in one direction upon very slight variations in either the current traversing the armature of the motor 10, or the voltage across the field winding 13, so that the regulator 12 is continuously vibrating to change the voltage impressed upon the field winding 13 from a minimum, through the medium, to a maximum value and vice versa, so rapidly that, at no time, does the circuit reach a steady condition. However, in this way, the current supplied to the motor 10 is maintained at a substantially constant value throughout a very wide range of motor speeds by variation in the ratio of the time that the contacts 20 are closed to the time that the contacts 19 are closed during the regulating cycle. The regulator vibrates sufficiently fast so that the ultimate maximum and minimum field values for the two regulator positions are not realized, but variations in the time ratio of the upper and lower positions of the regulator armature has the result of varying the effective value of the resistor in series with the field winding. The application of a constant value of current to the armature of the motor 10 will produce a constant pull on the reeling material, and the system may be regulated to maintain this constant current while the excitation of the field is being varied to change the speed of rotation of the motor 10, so that the desired result is accomplished.

Since it will be possible to modify the embodiment hereinbefore set forth and adapt it to numerous applications without departing from the spirit and scope of my invention, it is desired that the foregoing description be construed as entirely illustrative and not in a limiting sense.

I claim as my invention:

1. In a regulator system, a dynamo-electric machine having an armature winding and a field winding, a regulator for governing the excitation of said field winding in accordance with variations in a regulated characteristic of said machine and provided with two co-operating actuating windings and two pairs of cooperating contact members, means for providing a normally constant energization for one of said regulator windings, means for energizing the other of said windings in accordance with the regulated characteristic, and means for varying the energization of said first named winding in the one or in the other direction upon the engagement of the one or the other of said pairs of contact members.

2. In a regulator system, a dynamo-electric machine having an armature winding and a field winding, a regulator for governing the excitation of said field winding comprising two mutually attracting, relatively movable windings for biasing said regulator to one of two circuit-closing positions, means for biasing said regulator to the other of said circuit-closing positions, means for energizing one of said windings in accordance with the regulated quantity, and means for varying the energization of the other of said windings in accordance with the operation of the regulator.

3. In a regulator system, a dynamo-electric machine having an armature winding and a field winding, a resistor connected in series-circuit relation with said field winding, a regulator for governing the excitation of said field winding having two circuit-closing positions, one closing a circuit in shunt relation to said field winding and the other closing a circuit in shunt relation to said resistor, means for biasing said regulator to one of said circuit-closing positions, and two mutually attracting relatively movable windings for biasing said regulator to the other circuit-closing position, means for energizing one of said windings in accordance with the quantity being regulated, means for energizing the other of said windings, and means for increasing and decreasing the energization of said winding with respect to a predetermined value upon the closure of the one or the other of said regulator circuits.

4. In a regulator system, a dynamo-electric machine having an armature winding and a field winding, a regulator for governing the excitation of said field winding and operable to two circuit-closing positions, biasing means for actuating said regulator to one of said circuit-closing positions, and means comprising two mutually attracting relatively movable windings for actuating said regulator to the other of its circuit-closing positions, means for energizing one of said windings in accordance with the quantity being regulated, and means for varying the energization of the other of said windings in the one or in the other direction in accordance with operation of the regulator to the one or the other of its circuit-closing positions.

5. In a regulator system for an electric motor having an armature and a field winding, a resistor connected in series-circuit relation with the field winding, a vibrating regulator having a plurality of relatively movable operating coils, said regulator being disposed to short-circuit said resistor when the coils are in their attracted positions, one of said operating coils being connected in shunt relation to a portion of said resistor and another of said coils being connected to be energized in accordance with the current in the motor.

6. In a regulator system for an electric motor having an armature and a field winding, a resistor connected in series-circuit relation with the field winding, a vibrating regulator having two relatively movable operating coils, said coils being disposed to be attracted to each other when the sum of their currents exceeds a predetermined value to actuate means for short-circuiting the resistor to increase the voltage across the field of the motor, and to thereafter release said short circuit to permit the resistor to be again connected in circuit with the field windings, and means for energizing one of said coils in accordance with the current flowing in the armature winding of the motor.

7. In a regulator system for an electric motor having an armature and a field winding, a resistor connected in series-circuit relation with the field winding, means for varying the torque exerted by the motor comprising means responsive to the armature current and influenced by variations in the voltage drop across a section of said resistor for intermittently short-circuiting said resistor to govern the voltage applied to the field winding and regulate the armature current in the motor.

In testimony whereof, I have hereunto subscribed my name this 15th day of May, 1928.

STEPHEN A. STAEGE.